US012761487B2

(12) United States Patent
Shutzberg et al.

(10) Patent No.: US 12,761,487 B2
(45) Date of Patent: Oct. 13, 2026

(54) ELECTRONIC DEVICE

(71) Applicant: Apple Inc., Cupertino, CA (US)

(72) Inventors: Alison B. Shutzberg, San Francisco, CA (US); Spencer A. Larsen, Bothell, WA (US)

(73) Assignee: APPLE INC., Cupertino, CA (US)

( * ) Notice: Subject to any disclaimer, the term of this patent is extended or adjusted under 35 U.S.C. 154(b) by 319 days.

(21) Appl. No.: 18/433,195

(22) Filed: Feb. 5, 2024

(65) Prior Publication Data

US 2025/0060597 A1 Feb. 20, 2025

Related U.S. Application Data

(60) Provisional application No. 63/520,263, filed on Aug. 17, 2023.

(51) Int. Cl.
*G02B 27/01* (2006.01)

(52) U.S. Cl.
CPC .. *G02B 27/0176* (2013.01); *G02B 2027/0154* (2013.01)

(58) Field of Classification Search
CPC .................... G02B 27/0176; G02B 2027/0154
USPC ........................................... 359/630; 345/7–9
See application file for complete search history.

(56) References Cited

U.S. PATENT DOCUMENTS

2014/0375947 A1* 12/2014 Park .................. G02B 27/0176
351/178

* cited by examiner

*Primary Examiner* — William Choi
(74) *Attorney, Agent, or Firm* — Dorsey & Whitney LLP

(57) ABSTRACT

An electronic device (e.g., a head-mountable electronic device) can include a frame and a securement arm extending from the frame. The securement arm can include multiple arm segments and multiple joints interconnecting the arm segments. The arm segments can include a proximal arm segment coupled to the frame, a distal arm segment, and at least one intermediate arm segment between the proximal arm segment and the distal arm segment. Each joint can include adjacent first and second arm segments. Each joint can further include a biasing member configured to provide a biasing force resisting a relative movement between the first arm segment and the second arm segment. The biasing member can be configured to resist an outward rotation of one of the first arm segment or the second arm segment away from the viewing frame. Additional systems and methods are also disclosed.

15 Claims, 11 Drawing Sheets

ELECTRONIC DEVICE

CROSS-REFERENCE TO RELATED APPLICATION(S)

This claims priority to U.S. Provisional Patent Application No. 63/520,263 filed 17 Aug. 2023, and entitled "Electronic Device," the disclosure of which is hereby incorporated by reference in its entirety.

FIELD

The described embodiments relate generally to electronic devices. More particularly, the present embodiments relate to head-mountable electronic devices.

BACKGROUND

Recent advances in portable computing have enabled head-mountable devices that provide augmented and virtual reality experiences to users. Various component of these devices, such as display screens, viewing frames, securement arms, speakers, batteries, and other components, operate together to provide an immersive and comfortable experience. However, the anatomy of each user's head is unique. One user's head can be larger than another or one head can be a different shape. Other anatomical features, including relative positions of a user's nose, forehead, and ears, can vary widely between users as well. The anatomical variety of heads presents a challenge for head-mountable devices designed for comfort and reliability.

In some head-mountable devices, for example, securement arms that extend along, or make contact with, opposing sides of a user's head can be used to secure the device to the user's head. However, the dimensions, angles, shape, and other physical characteristics of the arms that may be sufficient to comfortably and reliably secure the device to one user's head may not be sufficient to comfortably and reliably secure the device to another user's head.

Additionally, head-mountable devices can be used in a variety of different settings and during a variety of different activities. These can range from lying down still in bed to mountain biking or hiking outdoors. Thus, even for a single user, the securement arms of a head-mountable device that are comfortable and sufficient for securing the device during one activity may not be comfortable or sufficient for another activity.

Therefore, a need exists in the art for an electronic device (e.g., a head-mountable device) that addresses the above deficiencies or at least offers an alternative to current systems and devices.

SUMMARY

Various examples of the present disclosure include a securement arm for a head-mountable device. The securement arm can include a plurality of arm segments and a plurality of joints interconnecting the plurality of arm segments. Each joint of the plurality of joints can include adjacent first and second arm segments of the plurality of arm segments. Each joint can further include a biasing member configured to provide a biasing force resisting a relative movement between the first arm segment and the second arm segment.

In one example, the biasing member can include an insert positioned at least partially between the first arm segment and the second arm segment. In one example, the insert can include an elastomer bumper positioned to compress to provide the biasing force. In one example, the insert can include a spring steel plate positioned to resist bending to provide the biasing force. In one example, the plurality of joints can include a first joint and a second joint. The first joint can include a first biasing member having a first spring rate. The second joint can include a second biasing member having a second spring rate different than the first spring rate. In one example, the biasing member can include an elastomer cord extending along the plurality of arm segments. In one example, the biasing member can include a shape memory material. In one example, a head-mountable device can include the securement arm. The securement can be a first securement arm, and the head-mountable device can include a frame a second securement arm. In one example, the head-mountable device can be a head-mountable electronic device.

Various examples of the present disclosure include a head-mountable device. The head-mountable device can include a frame and a pair of securement arms extending from the frame. Each securement arm of the pair of securement arms can include a plurality of arm segments including a proximal arm segment coupled to the frame, a distal arm segment, and at least one intermediate arm segment between the proximal arm segment and the distal arm segment. Each securement arm can further include a plurality of joints interconnecting the plurality of arm segments. Each joint of the plurality of joints can include adjacent first and second arm segments of the plurality of arm segments. Each joint can further include a biasing member configured to provide a biasing force resisting a relative movement between the first arm segment and the second arm segment.

In one example, the biasing member can include an elastomer bumper positioned to compress when the pair of securement arms are splayed away from each other. In one example, a groove can extend contiguously along the plurality of arm segments. The biasing member can include an elastomer cord positioned within the groove. In one example, each joint can define a pivot point between the first arm segment and the second arm segment. The groove can extend along an inner side of each pivot point. In one example, the biasing member can include a shape memory material having an original shape. The shape memory material can be configured to return to the original shape when heated. In one example, the shape memory material can be configured to plastically deform at room temperature. The shape memory material can be configured to return to the original shape when heated above room temperature.

Various examples of the present disclosure include a head-mountable electronic device. The head-mountable electronic device can include a viewing frame and a securement arm extending from the viewing frame. The securement arm can include a plurality of arm segments and a plurality of joints interconnecting the plurality of arm segments. Each joint of the plurality of joints can include adjacent first and second arm segments of the plurality of arm segments. Each joint can further include a biasing member configured to resist an outward rotation of one of the first arm segment or the second arm segment away from the viewing frame.

In one example, each joint can include a stop to limit an inward rotation of the one of the first arm segment or the second arm segment towards the viewing frame. In one example, the biasing member can include a first biasing member of shape memory material having a first original shape and extending contiguously along the plurality of arm segments. The head-mountable electronic device can include a second biasing member of shape memory material having a second original shape and extending contiguously along the plurality of arm segments. In one example, the securement arm can include an inner side and an opposite outer side. The first biasing member can extend along the inner side. The second biasing member can extend along the outer side. In one example, the first biasing member, when heated, can be configured to move the securement arm towards a user's head. The second biasing member, when heated, can be configured to move the securement arm away from the user's head.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
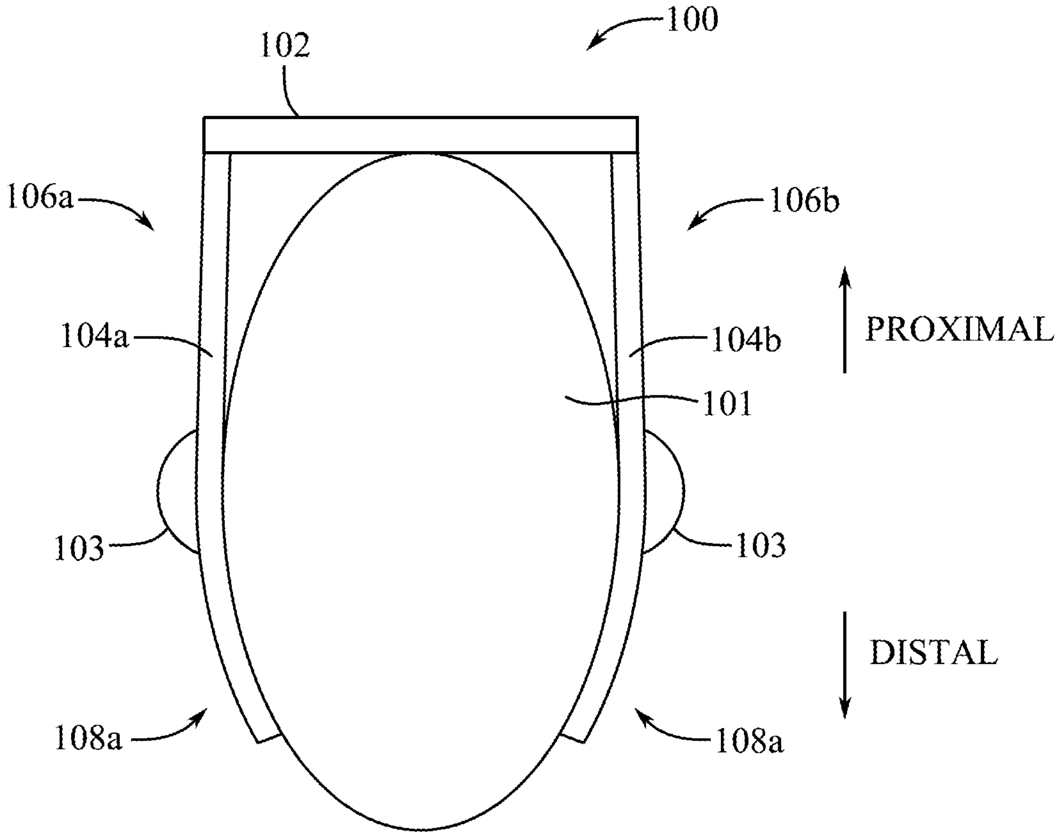
FIG. 1 shows a top view of an example of a head-mountable device worn by a user.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to electronic devices. More particularly, the present disclosure relates to head-mountable electronic devices. In at least one example, a head-mountable device can include a viewing frame and a securement arm extending from the viewing frame. Examples of head-mountable devices can include optical devices (e.g., glasses, sunglasses, etc.) or virtual/augmented reality devices that include an optical component. In the case of augmented reality devices, optical eyeglasses can be worn on the head of a user such that optical lenses and/or optical displays are positioned in front of the user's eyes. In another example, a virtual reality device can be worn on the head of a user such that a display screen is positioned in front of the user's eyes. The viewing frame can include a housing or other structural component supporting or housing the optical component, for example lenses or screens.

In a particular example, the head-mountable device can include a pair of securement arms extending from the frame. The pair of securement arms can apply pressure to or around a user's head to maintain the frame in position, such as in front of the user's eyes. In some examples, the securement arms can rest on top of the user's ears to assist in securing the head-mountable device to the head of the user.

In a particular embodiment, the securement arm can include a plurality of arm segments and a plurality of joints interconnecting the arm segments and allowing articulation of the arm segments. Each joint can include adjacent first and second arm segments and a biasing member configured to provide a biasing force resisting relative movement between the first and second arm segments. The biasing member can resist an outward rotation of one of the first arm segment or the second arm segment away from the frame.

In a particular embodiment, the biasing member can include an insert positioned (e.g., at least partially) between adjacent arm segments. The insert can be an elastomer bumper or a spring steel plate, among other examples. Respective joints can include respective biasing members, such as a first joint including a first biasing member, and a second joint including a second biasing member. The first biasing member can have a first spring rate, and the second biasing member can have a second spring rate different than the first spring rate.

In a particular embodiment, the biasing member can include an elastomer cord biasing the securement arm against the user's head. The elastomer cord can extend along the multiple arm segments, such as within a groove defined in the arm segments. The groove can extend along an inner side of the joints (e.g., along an inner side of each pivot point of the joints) to bias the cord towards the user's head.

In a particular embodiment, the biasing member can include a shape memory material. The shape memory material can have an activation temperature. The shape memory material can be heated (e.g., to at least the activation temperature) to return the shape memory material to its original shape. The shape memory material can plastically deform at room temperature and return to its original shape when heated above room temperature.

In a particular embodiment, the securement arm can include first and second biasing members of shape memory material. The first biasing member can extend along a first side (e.g., an inner side) of the securement arm, and the second biasing member can extend along a second side (e.g., an outer side) of the securement arm. The first biasing member, when heated, can move the securement arm in a first direction. The second biasing member, when heated, can move the securement arm in a second direction opposite the first direction.

Accordingly, examples of securement arms described in the present disclosure can provide secure and comfortable donning of head-mountable electronic devices for a wide range of user head sizes, shapes, and other head and face anatomical feature variations.

These and other embodiments are discussed below with reference to FIGS. 1-11. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a top view of an example of a head-mountable device 100. The head-mountable device 100 (hereinafter "device" for sake of convenience) can be any device or system configured to be worn on the head 101 of a user, such as a head-mountable electronic device, an optical device, and the like. Thus, the term "device" is used for sake of convenience without intent to limit. As shown, the device 100 can include a viewing frame 102 configured to secure one or more optical lenses or display screens in front of the eyes of the user. The device 100 can include one or more securement arms 104*a*, 104*b* (e.g., temple arms) extending from the viewing frame 102. For example, the device 100 can include a first securement arm 104*a* and a second securement arm 104*b*.

Each securement arm 104*a* or 104*b* can be secured to the viewing frame 102 and extend (e.g., distally) toward the rear of the user's head 101. As shown, the securement arms 104*a*, 104*b* can extend over the user's ears 103 and curve along (e.g., adjacent) the user's head 101. The securement arms 104*a*, 104*b* can apply opposing pressures to the sides of the user's head 101, as shown, to secure the device 100 to the user's head 101. The securement arms 104*a*, 104*b* can also rest on the user's ears 103 and secure the device 100 via friction between the securement arms 104*a*, 104*b* and the head 101.

In one example, the securement arms 104*a*, 104*b* can include a first portion 106*a*, 106*b* and a second portion 108*a*, 108*b*, respectively. The second portions 108*a*, 108*b* can be curved or disposed at an angle relative to the first portions 106*a*, 106*b*, such that at least portions of the securement arms 104*a*, 104*b* make contact along a length of the side of the user's head 101. In the illustrated example of FIG. 1, at least the second portions 108*a*, 108*b* of the securement arms 104*a*, 104*b* curve with the user's head 101 to make contact with the head 101. In addition, the securement arms 104*a*, 104*b* can extend distally and curve around a portion of the back of user's head 101, as shown, to hook around the head 101 and prevent the viewing frame 102 from being pulled forward proximally off the face or head 101 of the user.

As can be appreciated, the head 101 of the user can be a unique shape and size with a unique position of each ear 103 such that the curvature of the securement arms 104*a*, 104*b* shown in FIG. 1 may not be a match for the curvature and anatomy of the head of a different user. In general, the hooked configuration of the securement arms 104*a*, 104*b* around the sides and rear of the head 101, in addition to the increased contact area and/or length between the securement arms 104*a*, 104*b* and head 101, resist the viewing frame 102 from being pulled off the user's head 101. However, forces can arise from jostling and bumping during normal use of the device 100, or more detrimentally during falls or contact with other objects during use, which may exceed the contact forces provided by the securement arms 104*a*, 104*b*. Thus, the curvature of the securement arms 104*a*, 104*b*, and more particularly the curvature of the second portions 108*a*, 108*b*, which can be effective for retaining the device 100 on the head 101 shown in FIG. 1, may not be effective for a user with a head of a different size or shape.

In at least one example, the first portions 106*a*, 106*b* can be referred to as proximal portions. In such an example, the second portions 108*a*, 108*b* can be referred to as distal portions. The terms "proximal" and "distal" can be used to reference the position of various components described herein relative to the viewing frame 102 of the device 100. The orientation of the "proximal" and "distal" directions is shown in FIG. 1.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2A:
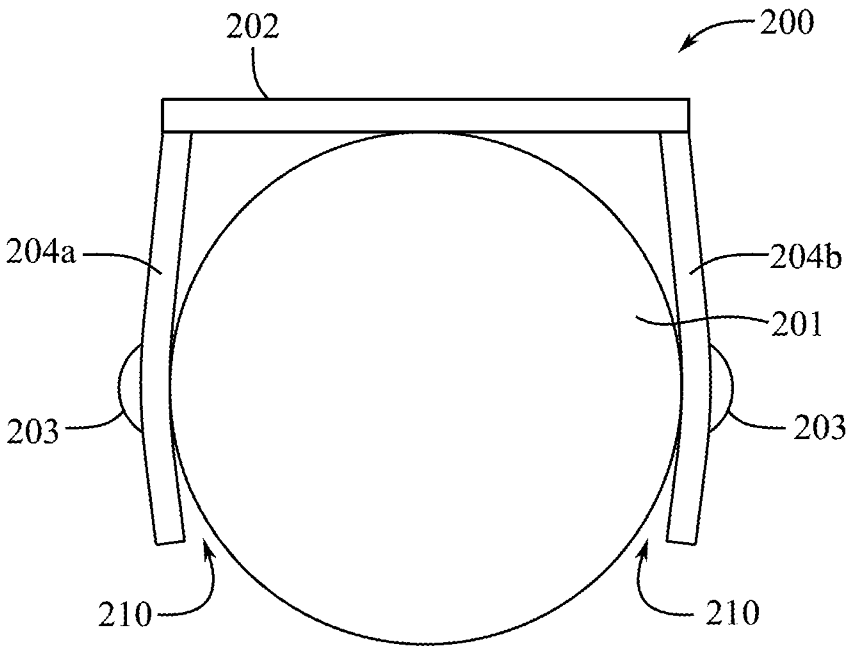
FIGS. 2A-2B show top views of an example of a head-mountable device worn by a user.
Figure 2B:
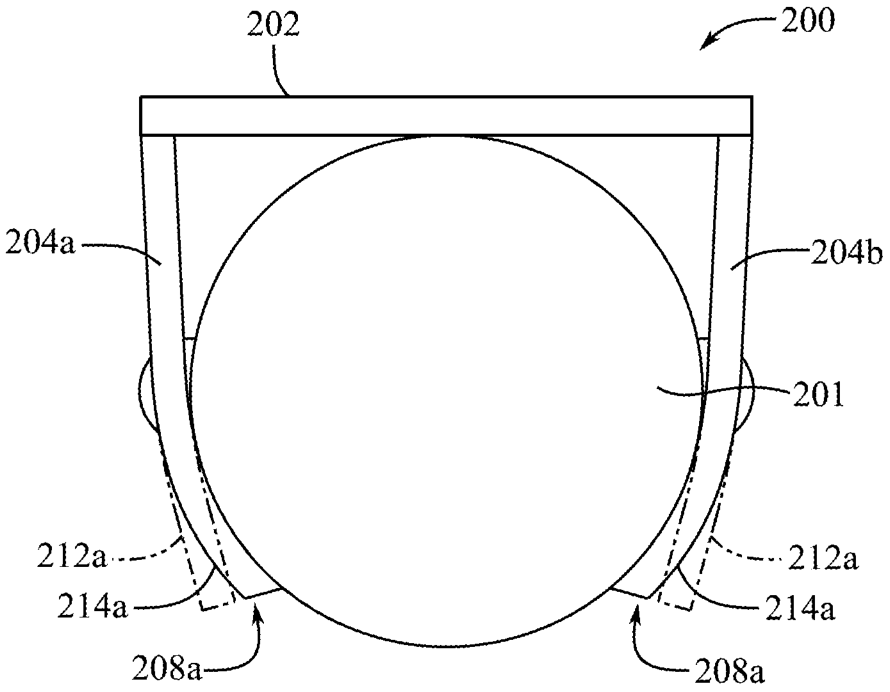

A user having a head 201 of a different size and shape as that of the head 101 shown in FIG. 1 is illustrated in FIGS. 2A-2B. Referring to FIG. 2A, the same or similar device 200 can include a viewing frame 202 secured, at least in part, to the user's head 201 via one or more securement arms 204*a*, 204*b*. In one example, the device 200 can include the viewing frame 202 and a pair of securement arms 204*a* and 204*b* extending from the frame. As shown, the securement arms 204*a*, 204*b* can extend distally along opposing sides of the head 201. In the example shown, the arms 204*a*, 204*b* can extend over the user's ears 203 and toward the rear of the user's head 201. However, due to the shape of the user's head 201, the curvature of the arms 204*a*, 204*b* results in a gap 210 between the head 201 and the securement arms 204*a*, 204*b*.

Referring to FIG. 2B, in at least one example, the securement arms 204*a*, 204*b* can be configured to eliminate the gap 210 and increase the contact area and/or length between the securement arms 204*a*, 204*b* and the head 201. For example, the securement arms 204*a*, 204*b* can be reconfigured (e.g., automatically, manually) to hook further around the user's head 201 to more effectively secure the device 200 to the head 201. As shown in FIG. 2B, the securement arms 204*a*, 204*b* can include second portions 208*a*, 208*b*, respectively, that can be adjusted (e.g., automatically or manually) to curve with the profile and anatomical features of the user's head 201 as shown. First positions 212*a*, 212*b* of the second portions 208*a*, 208*b*, which result in the gap 210 shown in FIG. 2A, is shown in dotted lines. Adjusted second positions 214*a*, 214*b* of the second portions 208*a*, 208*b* are shown conforming to a curvature of the user's head 201. The second portions 208*a*, 208*b* can be adjusted by the user to accommodate the user's head 201 as shown to eliminate the gap 210 and more securely fasten or hold the device 200 onto the user's head 201.

Any of the features, components, and/or parts, including the arrangements and configurations thereof shown in FIGS. 2A-2B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A-2B.

Figure 3:
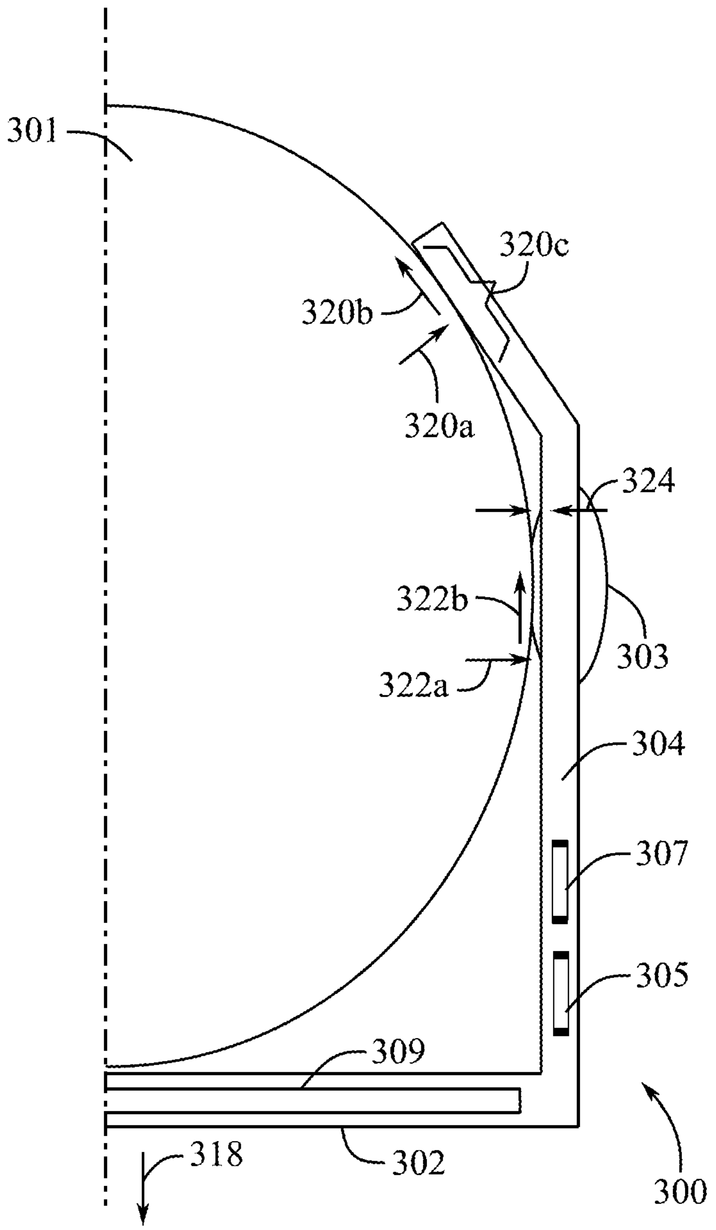
FIG. 3 shows a top view of an example of a head-mountable device worn by a user.

FIG. 3 shows a top view of another example of a head-mountable device 300, including a frame 302 and a securement arm 304 extending from the frame 302 for engagement with the user's head 301. Although not illustrated, the device 300 can include a second securement arm extending from the frame 302 for engagement with an opposite side of the user's head 301. The securement arm 304 can be configured to engage the user's head 301 to hold the device 300 in front of the eyes of the user. For example, the securement arm 304 can apply pressure against the side and/or back of the head 301 to hold the device 300 in place, such as against the weight of the device 300 ("$F_{weight}$" 318). In one example, the distal end of the securement arm 304 can apply pressure against the user's head 301, causing a tip force ("$F_{tip}$" 320*a*) and a tip friction ("$F_{F\_tip}$" 320*b*) at the tip's contact with the head 301. Depending on $F_{weight}$ 318, a large $F_{tip}$ 320*a* can be required to maintain stability on the head 301. For example, a large $F_{tip}$ 320*a* can be required to generate sufficient $F_{F\_tip}$ 320*b* to counteract $F_{weight}$ 318. However, the user's comfort level can be driven by minimizing a tip pressure ("$P_{tip}$"). The $P_{tip}$ can be defined by $F_{tip}$ 320*a* divided by a tip contact area ("$C_{tip}$" 320*c*) (e.g., $P_{tip}=F_{tip}/C_{tip}$).

In one example, a length of the securement arm 304 can apply pressure against the user's head 301, such as above the user's ear 303, causing an arm force ("$F_{arm}$" 322*a*) and an arm friction ("$F_{F\_arm}$" 322*b*) at the arm's contact with the side of the head 301. In one example, $F_{arm}$ 322*a* and $F_{F\_arm}$ 322*b* can be additive to $F_{tip}$ 320*a* and $F_{F\_tip}$ 320*b* where the securement arm 304 contacts the user's head 301 along the sides and back of the head 301. In such examples, the tip and arm pressures can be tailored such that the additive effect of both counteract $F_{weight}$ 318. In examples in which a gap 324 is defined between the securement arm 304 and the head 301 (e.g., above the ear 303, at the back of the head 301, etc.), the device 300 can rely on only one of the tip pressure or the arm pressure to counteract $F_{weight}$ 318. In such examples, large forces and pressure can lead to user discomfort.

In one example, the securement arm 304 can include one or more electronic components, including a first electronic component 305 and a second electronic component 307. The first electronic component 305 can include a projector, waveguide, speaker, processor, or memory component and the second electronic component 307 can include a battery or any other component including those described with reference to the first electronic component 305. In examples where the electronic component(s) 305, 307 includes a projector and/or a waveguide, the projector and/or waveguide can be configured to project and light that is display on a window 309 secured to the frame 302. The window 309 can include an optically transparent material. The window 309 can include an optical lens. The window 309 can include a transparent window through which light passes without redirecting light or vision correcting geometries. In examples where the second electronic component 307 includes a battery, the battery can be connected to the first electronic component 305 via the electronic circuitry component to deliver power to the first electronic component 305.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

FIGS. 4A-4E show examples of another securement arm 404 of a head-mountable device and illustrate example ranges of motion. In one example, the securement arm 404 can be a multi-pivot (sectioned) arm to accommodate a wide range of head sizes and shapes while being comfortable and stable. For example, a multi-pivot (sectioned) arm can reduce pressure hot spots against a user's head, thereby increasing user comfort while wearing. Additionally, or alternatively, a multi-pivot (sectioned) arm can improve grip, such as increasing the contact area with the user's head as the securement arm 404 more readily conforms to the user's head. Additionally, or alternatively, a multi-pivot (sectioned) arm can reduce SKU counts as the securement arm 404 accommodates a wider range of head sizes and shapes. In one example, multiple pivot points can increase the percentage of head sizes that find the securement arm 404 comfortable. Additionally, or alternatively, multiple pivot points can increase the arm to head contact area, providing a more distributed load against the user's head. Additionally, or alternatively, multiple pivot points can soak up facial or head asymmetry within the securement arm 404.

As shown, the securement arm 404 can include a plurality of arm segments 428. In one example, the securement arm 404 can include a proximal arm segment 428*a* and a distal arm segment 428*b*. The proximal arm segment 428*a* can be coupled to a frame of an associated head-mountable device (e.g., to frame 102, 202, or 302). The distal arm segment 428*b* can define the distal end of the securement arm 404. In a further example, the securement arm 404 can include at least one intermediate arm segment 428*c* between the proximal arm segment 428*a* and the distal arm segment 428*b*. Depending on the application, the securement arm 404 can include one intermediate arm segment 428*c*, two intermediate arm segments 428*c*, three intermediate arm segments 428*c*, four intermediate arm segments 428*c*, or more than four intermediate arm segments 428*c*.

The number of arm segments 428 may determine one or more characteristics of the securement arm 404. For example, the number of arm segments 428 can set an arm wrap characteristic of the securement arm 404, such as a higher number of arm segments 428 allowing the securement arm 404 to wrap more completely around the user's head (e.g., to better conform to different head shapes and sizes). Conversely, a lower number of arm segments 428 can limit the arm wrap of the securement arm 404.

In one example, the securement arm 404 can include a plurality of joints 430 interconnecting the arm segments 428. As used herein, the term "joint" can refer to any structure coupling adjacent arm segments 428 and enabling one arm segment 428 to rotate or pivot relative to another, for example, a first arm segment relative to a second arm segment. In one example, the first and second arm segments can be separate pieces such that the joint 430 includes one or more structures rotatably connecting both separate pieces. For example, the joint 430 can include a pin joint, a knuckle joint, a revolute joint, a universal joint, or a spherical joint, among other mechanical joint structures. In some examples, the first and second arm segments can be integrally formed as a unitary piece such that the joint 430 is defined by a portion or section of the unitary piece that allows the adjacent arm segments to rotate relative to each other. For example, the joint 430 can include a reduced cross-section or flexible portion that allows one arm segment 428 to rotate relative to another arm segment 428 by bending at the joint 430 (e.g., a living hinge).

Figure 4A:
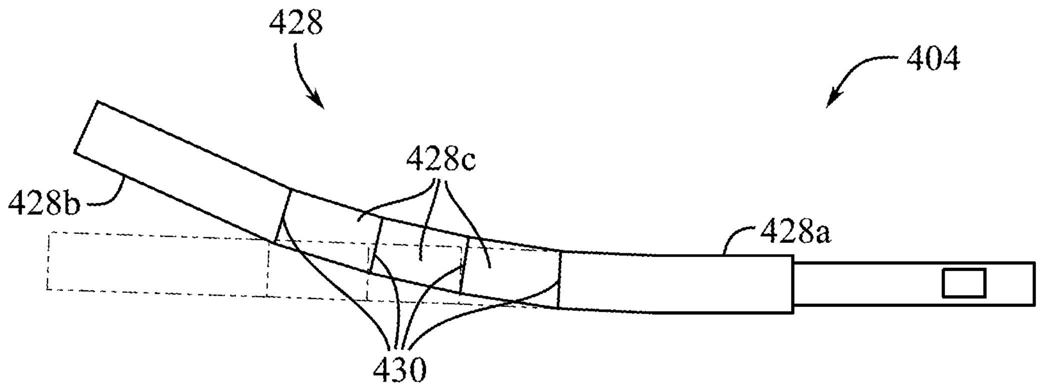
FIGS. 4A-4E show examples of a securement arm of a head-mountable device and illustrate example ranges of motion.

FIG. 4A illustrates the securement arm 404 having a first range of motion. As shown, the securement arm 404 can move between a first configuration (e.g., shown in dotted lines allowing donning and doffing of an associated head-mountable device) and a second, wrapped configuration to engage a user's head. To accommodate wrapping in the second configuration, each joint 430 can have or accommodate a range of motion (e.g., an arm sweep). For instance, in the example of FIG. 4A, each joint 430 can accommodate 5-degrees of rotation or sweep. In such examples, the multiple joints 430 can allow a total of 20-degrees of rotation/sweep in the securement arm 404, although other configurations are contemplated.

Figure 4B:
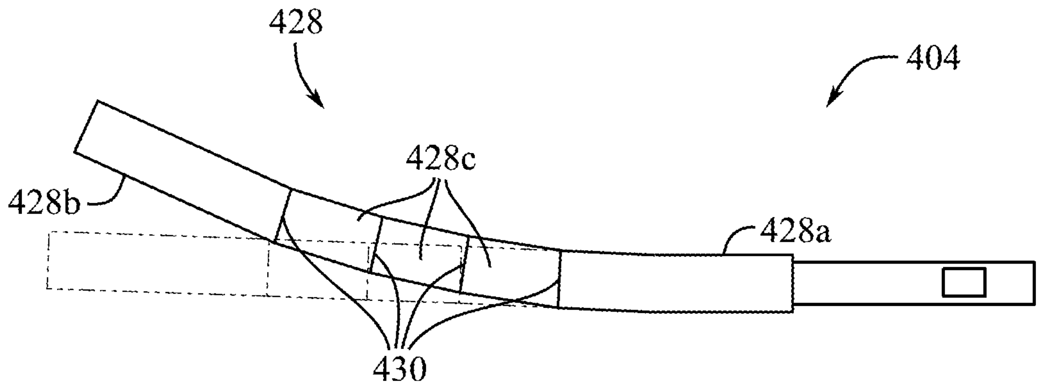

FIG. 4B illustrates the securement arm 404 having a second range of motion. The second range of motion can be different than the first range of motion. For instance, in the example of FIG. 4B, each joint 430 can accommodate 6-degrees of rotation or sweep. In such examples, the multiple joints 430 can allow a total of 24-degrees of rotation/sweep in the securement arm 404, although other configurations are contemplated.

Figure 4C:
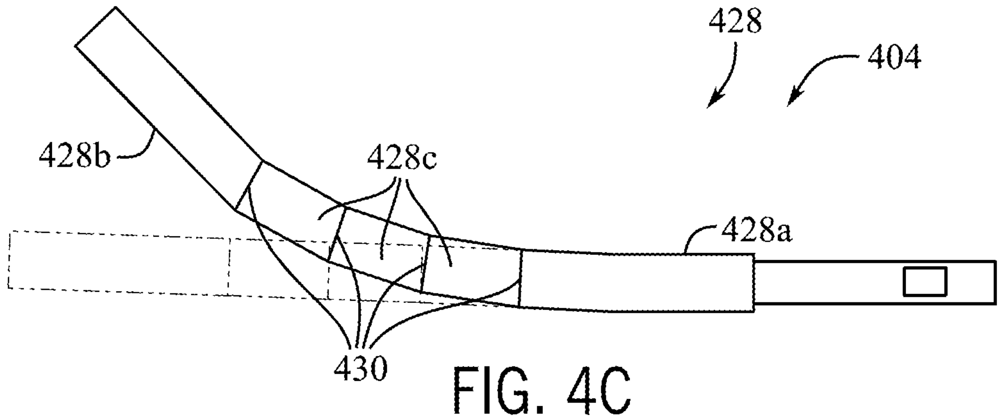

FIG. 4C illustrates the securement arm 404 having a third range of motion. The third range of motion can be different than the first range of motion and the second range of motion. For instance, in the example of FIG. 4C, each joint 430 can accommodate 10-degrees of rotation or sweep. In such examples, the multiple joints 430 can allow a total of 40-degrees of rotation/sweep in the securement arm 404, although other configurations are contemplated.

Figure 4D:
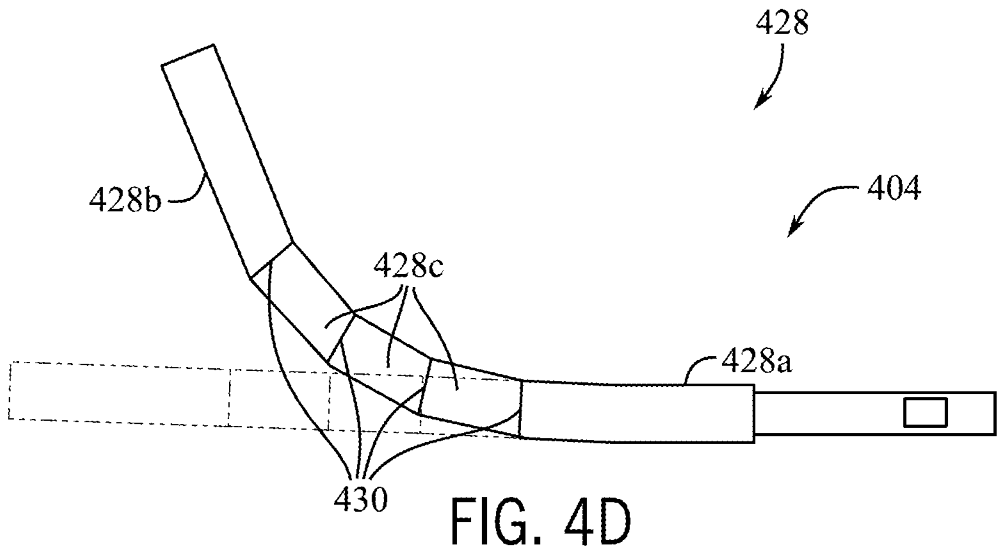

FIG. 4D illustrates the securement arm 404 having a fourth range of motion. The fourth range of motion can be different than the first range of motion, the second range of motion, and the third range of motion. For instance, in the example of FIG. 4D, each joint 430 can accommodate 15-degrees of rotation or sweep. In such examples, the multiple joints 430 can allow a total of 60-degrees of rotation/sweep in the securement arm 404, although other configurations are contemplated.

Figure 4E:
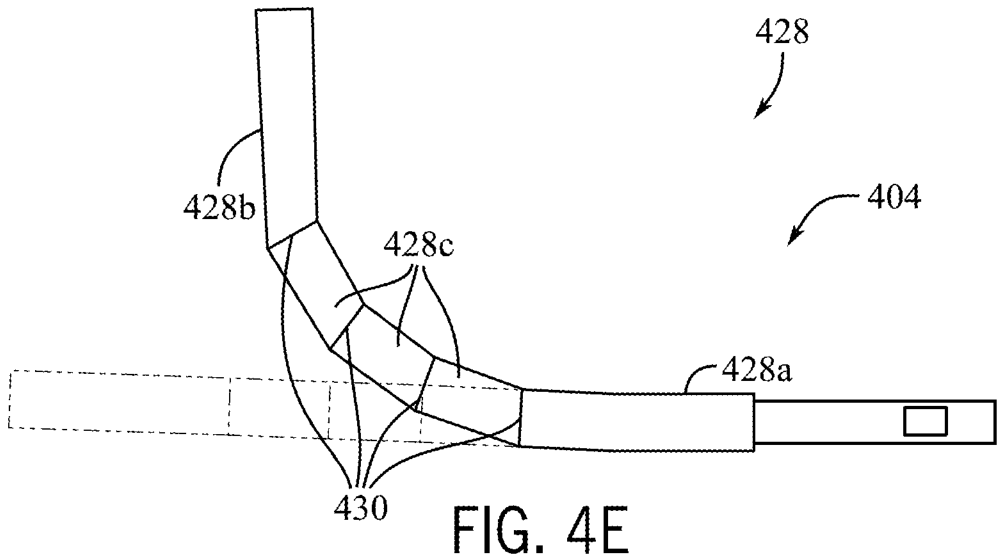

FIG. 4E illustrates the securement arm 404 having a fifth range of motion. The fifth range of motion can be different than the first range of motion, the second range of motion, the third range of motion, and the fourth range of motion. For instance, in the example of FIG. 4E, each joint 430 can accommodate 20-degrees of rotation or sweep. In such examples, the multiple joints 430 can allow a total of 80-degrees of rotation/sweep in the securement arm 404, although other configurations are contemplated. In one example, the tip of the securement arm 404 can be closer to 90-degrees due to arm geometry.

Any of the features, components, and/or parts, including the arrangements and configurations thereof shown in FIGS. 4A-4E can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-4E.

Figure 5A:
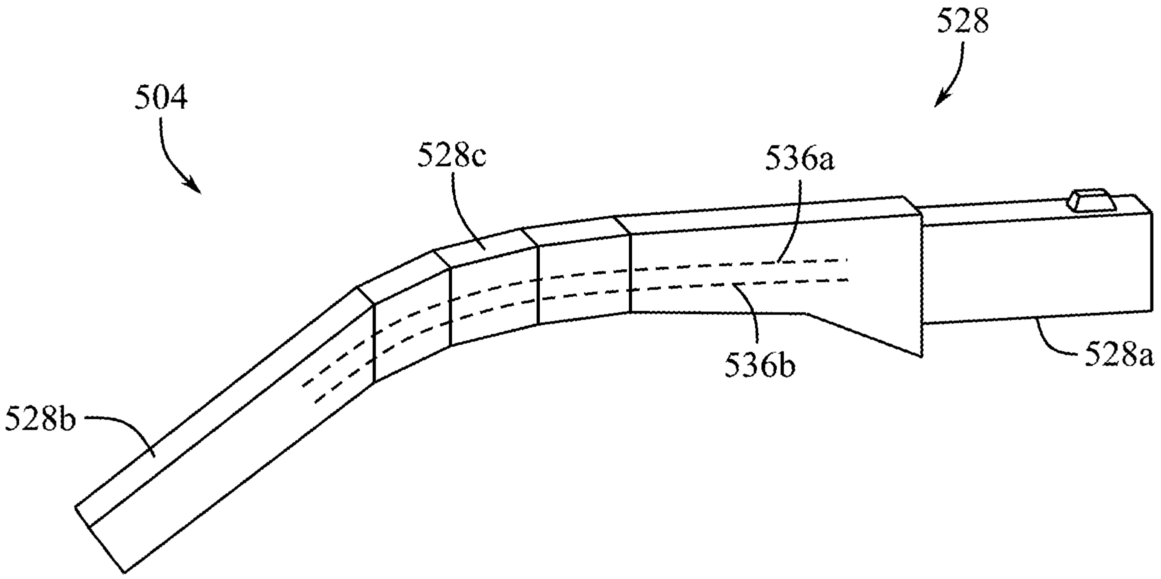
FIGS. 5A-5B show other examples of a securement arm of a head-mountable device.

FIG. 5A shows another example of a securement arm 504 of a head-mountable device. The securement arm 504 can include a biasing member 536 configured to provide a biasing force resisting a relative movement between first and second arm segments 528. For example, the biasing member 536 can resist relative movement between a proximal arm segment 528*a* and a distal arm segment 528*b*, between a proximal arm segment 528*a* and an intermediate arm segment 528*c*, between a distal arm segment 528*b* and an intermediate arm segment 528*c*, between adjacent intermediate arm segments 528*c*, or any combination thereof. In one example, the biasing member 536 can resist an outward rotation of one arm segment (e.g., one of a first arm segment or a second arm segment) away from a frame or viewing frame of associated head-mountable device.

In one example, the biasing member 536 can include a shape memory material. For instance, the biasing member 536 can recover its original shape from a significant and seemingly plastic deformation when a particular stimulus is applied (e.g., a shape memory effect). For example, the biasing member 536 can be bent to change its shape, such as to set a particular orientation, position, or shape of the securement arm 504. In such examples, the biasing member 536 can be heated to return to its original shape. In one example, the shape memory material can be configured to plastically deform at room temperature. In such examples, the shape memory material can be configured to return to its original shape when heated above room temperature. In one example, the shape memory material can include Nitinol, or nickel titanium, among other materials.

In one example, the biasing member 536 can include a first biasing member 536*a* of shape memory material having a first original shape, and a second biasing member 536*b* of shape memory material having a second original shape. As shown, the first biasing member 536*a* can extend contiguously along the plurality of arm segments 528, such as extending throughout the arm segments 528 in an unbroken manner. The second biasing member 536*b* can also extend contiguously along the plurality of arm segments 528, such as extending throughout the arm segments 528 in an unbroken manner. In one example, the first biasing member 536*a* can extend along one side of the securement arm 504, and the second biasing member 536*b* can extend along another side of the securement arm 504. For instance, the first and second biasing members 536*a*, 536*b* can extend along respective top and bottom sides of the securement arm 504, although other configurations are contemplated. Such configurations can limit twisting of the securement arm 504, such as preventing the securement arm 504 from twisting along a lengthwise axis (e.g., along a major longitudinal axis, along an axis extending from the proximal arm segment 528*a* to the distal arm segment 528*b*, etc.).

The shape memory material can have many shapes and configurations. In one example, the first and second biasing members 536*a*, 536*b* can be formed as separate wires of shape memory material extending through the arm segments 528. In another example, the biasing member 536 can be formed as a ribbon or sheet of shape memory material extending through the arm segments 528. In such examples, the ribbon or sheet of shape memory material can resist twisting of the securement arm 504 along its length.

Figure 5B:
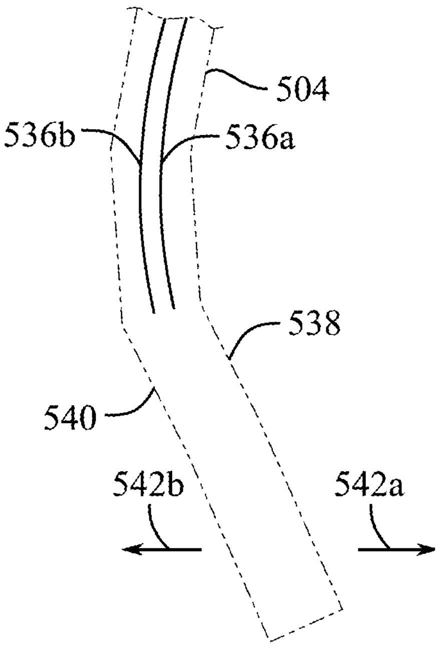

FIG. 5B illustrates another configuration of the first and second biasing members 536*a*, 536*b*. As shown, the securement arm 504 can include an inner side 538 and an opposite outer side 540. The first biasing member 536*a* can extend along the inner side 538, and the second biasing member 536*b* can extend along the outer side 540. In such examples, the first biasing member 536*a* can be plastic deformable (e.g., at room temperature), such as to bend to change the shape of the securement arm 504. The second biasing member 536*b*, on the other hand, can be elastic or super elastic (e.g., at room temperature), such as to help return the securement arm 504 and/or the first biasing member 536*a* to original state/shape.

In one example, at least one of the first biasing member 536*a* or the second biasing member 536*b* can be configured to return to original state/shape when heated. For instance, after plastic deformation of the first biasing member 536*a*, the first biasing member 536*a* can be heated to allow the biasing member to return to original state/shape, such as to allow a reconfiguration of the securement arm 504. In one example, the elastic second biasing member 536*b* can bias the first biasing member 536*a* towards its original state/shape (e.g., providing a spring back feature).

In one example, the first biasing member 536*a*, when heated, can be configured to move the securement arm 504 in a first direction 542*a*. The second biasing member 536*b*, when heated, can be configured to move the securement arm 504 in a second direction 542*b* opposite the first direction 542*a*. In one example, as associated head-mountable device can include software configured to register user touch, motion, and/or pupil presence and actuate an appropriate biasing member 536 (e.g., Nitinol wire). For instance, when a pupil is detected after motion, the first biasing member 536*a* can be heated to contract the securement arm 504 (e.g., the distal tip of the securement arm 504) around the user's head, stretching out the second biasing member 536*b*. When the user touches the securement arm 504 and doffing motion is detected, the second biasing member 536*b* can be heated to pull the securement arm 504 (e.g., the distal tip of the securement arm 504) away from the user's head, such as for easier device removal.

In one example, an inner biasing member can be used without an outer biasing member. In such examples, the user can open the arm tips to donn the head-mountable device, stretching out the inner biasing member. When the device is donned, the device can activate the inner biasing member by heating it, causing the arm tips to wrap. In one example, hyper-elastic material can be used as an alternative to memory shape with heat activation material.

Any of the features, components, and/or parts, including the arrangements and configurations thereof shown in FIGS. 5A-5B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5A-5B.

Figure 6:
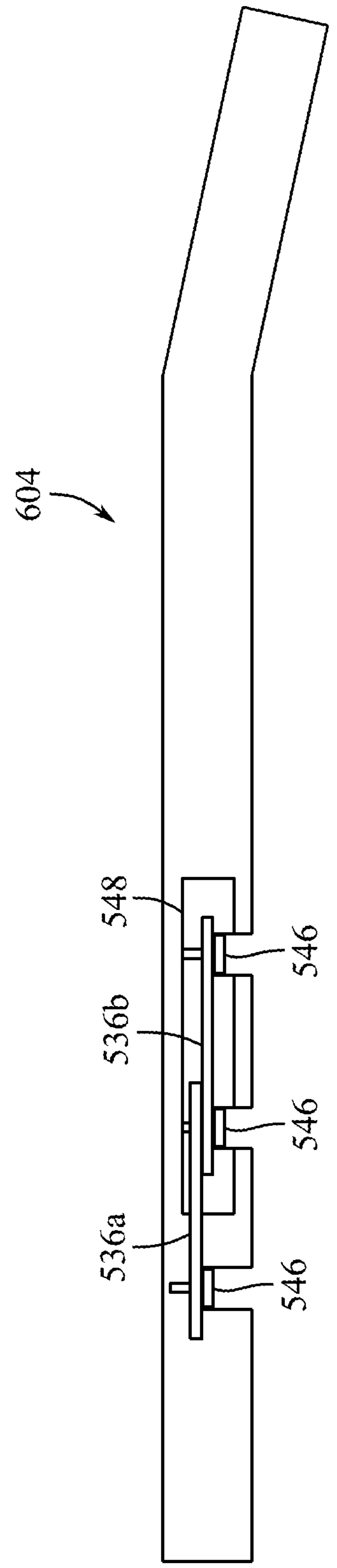
FIG. 6 shows another example of a securement arm of a head-mountable device.

FIG. 6 shows another example of a securement arm 604 having a first biasing member 636*a* and a second biasing member 636*b*. The first biasing member 636*a* can be a sheet of shape memory material (e.g., a Nitinol sheet), and the second biasing member 636*b* can be spring steel. Each biasing member can be coupled to the securement arm 604 via one or more fasteners 546. As shown, the first and second biasing members 636*a*, 636*b* can overlap at an attachment point or region (e.g., such that the first and second biasing members 636*a*, 636*b* are secured to the securement arm 604 by the same fastener(s) 546).

In one example, the securement arm 604 can be over-bent to a desired location for fit such that the second biasing member 636*b* applies some load onto the user's head. For instance, the securement arm 604 can have a flexible region 548 allowing arm flex. Deformation may occur in the first biasing member 636*a*. The first biasing member 636*a* can have a lower yield point than the second biasing member 636*b* but should be high enough to limit arm unwrap during use. Should the user wish to readjust the securement arm 604 (e.g., for fit, to sell the device, etc.), the user can activate a self-healing function of the securement arm 604. For example, the first biasing member 636*a* can be heated above its activation temperature, causing the first biasing member 636*a* to revert back to its pre-stressed state/shape, thereby moving the securement arm 604 back to its original factory condition position.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7A:
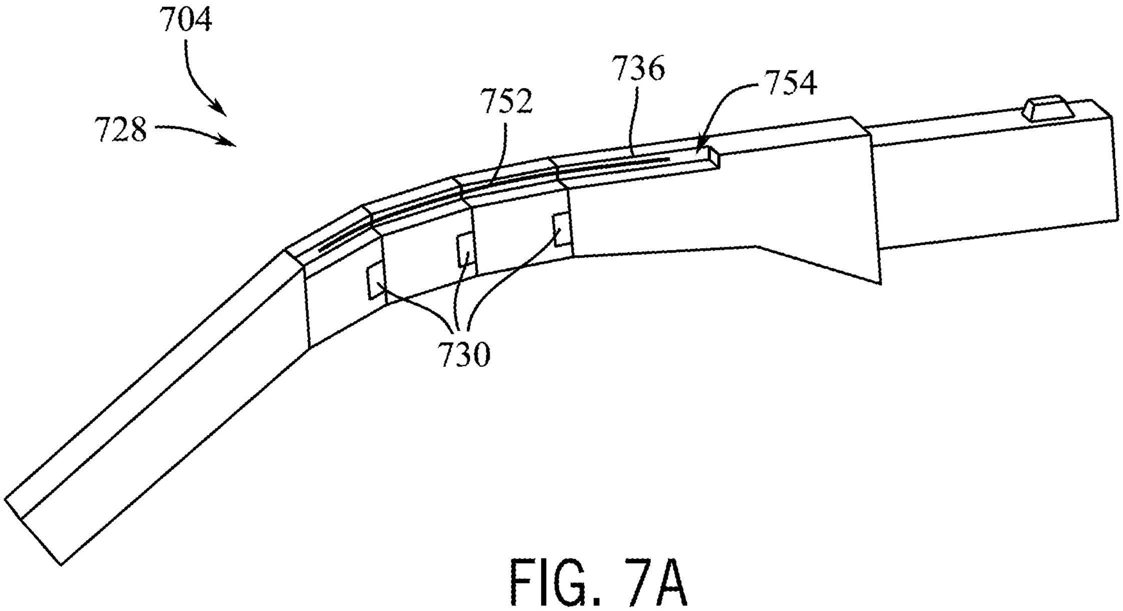
FIGS. 7A-7B show other examples of a securement arm of a head-mountable device.

FIG. 7A shows another example of a securement arm 704 having a plurality of arm segments 728, a plurality of joints 730 interconnecting the arm segments 728, and a biasing member 736 to resist relative movement between adjacent arm segments 728. In one example, the biasing member 736 can include an elastomer cord 752 extending along the plurality of arm segments 728. A groove 754 can extend contiguously along the plurality of arm segments 728, such as extending along the arm segments 528 in an unbroken manner. For example, the groove 754 can be defined in the top of each arm segment 528 such that a single groove is defined when the arm segments 528 are connected together. As shown, the elastomer cord 752 can be positioned within the groove 754.

Figure 7B:
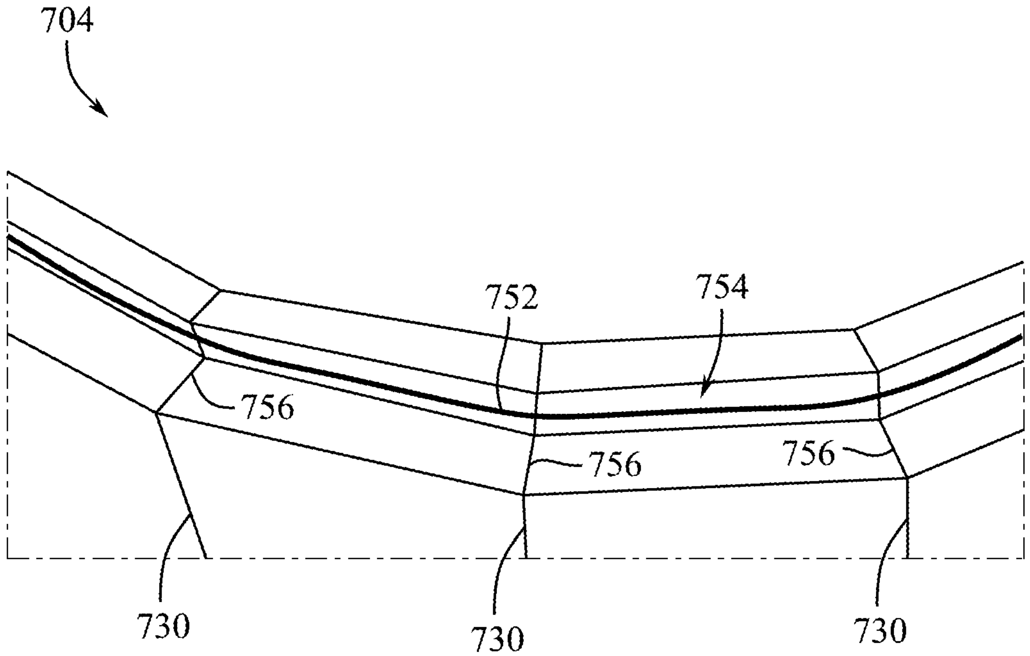

FIG. 7B shows an enlarged partial view of the securement arm 704. In one example, each joint 730 can define a pivot point 756 between adjacent arm segments 728. The pivot point 756 can be defined at the center of the joint 730 or asymmetrically towards one side of the securement arm 704. The groove 754 can extend along an inner side of each pivot point 756. In such examples, the elastomer cord 752 can be biased towards a user's head and installed in a tensile state to apply a load to the user. In one example, the walls of the groove 754 can prevent the elastomer cord 752 from leaving the working envelope (groove 754) (e.g., to prevent interfering with a user's skin or hair).

Any of the features, components, and/or parts, including the arrangements and configurations thereof shown in FIGS. 7A-7B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 7A-7B.

Figure 8A:
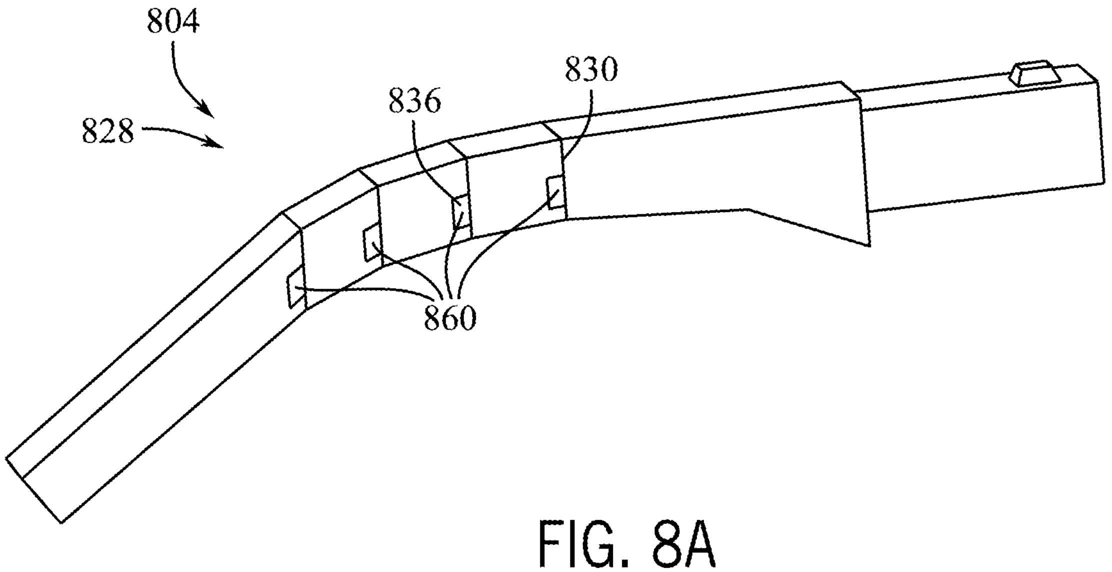
FIGS. 8A-8B show other examples of a securement arm of a head-mountable device.

FIG. 8A shows another example of a securement arm 804 having a plurality of arm segments 828, a plurality of joints 830 interconnecting the arm segments 828, and a biasing member 836 to resist relative movement between adjacent arm segments 828. In one example, the biasing member 836 can include an insert 860 positioned at least partially between adjacent arm segments 828. For example, an insert 860 can be positioned at each joint 830 of the securement arm 804. In one example, the insert 860 can include an elastomer bumper, although other configurations are contemplated, including those described below.

Figure 8B:
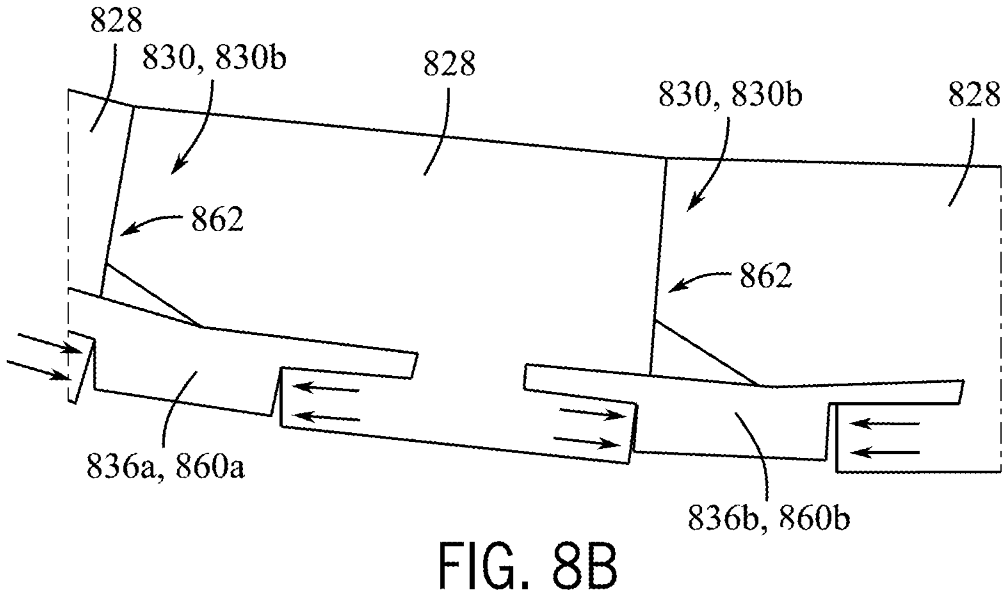

FIG. 8B shows a cross-sectional view of the securement arm 804. As shown, the insert 860 (e.g., elastomer bumper) can be positioned to compress to provide a biasing force resisting relative movement between adjacent arm segments 828. For example, as shown in FIG. 8B, the inserts 860 can be compressed when the securement arm 804 is opened (e.g., when a pair of securement arms 804 are splayed away from each other), such as for donning or doffing an associated head-mountable device. In such examples, the nominal, uncompressed state of the inserts 860 can be a wrapped position of the securement arm 804. In one example, each joint 830 can include a stop 862 to limit an inward rotation of an arm segment 828 (e.g., one of a first arm segment or a second arm segment) towards the viewing frame of an associated head-mountable device. In such examples, the inserts 860 can bias the arm segments 828 towards the stops 862. In one example, the inserts 860 can bias the arm segments 828 against the stops 862. The stop 862 can be defined by an interference between the adjacent arm segments 828. For instance, a wall of one arm segment 828 can engage a wall of another arm segment 828 to define the stop 862.

In one example, the inserts 860 can be varied, such as to adjust one or more load points of the securement arm 804. For instance, the inserts 860 can be varied along the length of the securement arm 804 to create higher pressures near the user's ear and lower pressures at the back of the user's head, or vice-versa. In one example, the joints 830 can include a first joint 830*a* and a second joint 830*b*. The first joint 830*a* can include a first biasing member 836*a* (e.g., a first insert 860*a*) having a first spring rate. The second joint 830*b* can include a second biasing member 836*b* (e.g., a second insert 860*b*) having a second spring rate different than the first spring rate.

Any of the features, components, and/or parts, including the arrangements and configurations thereof shown in FIGS. 8A-8B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 8A-8B.

Figure 9A:
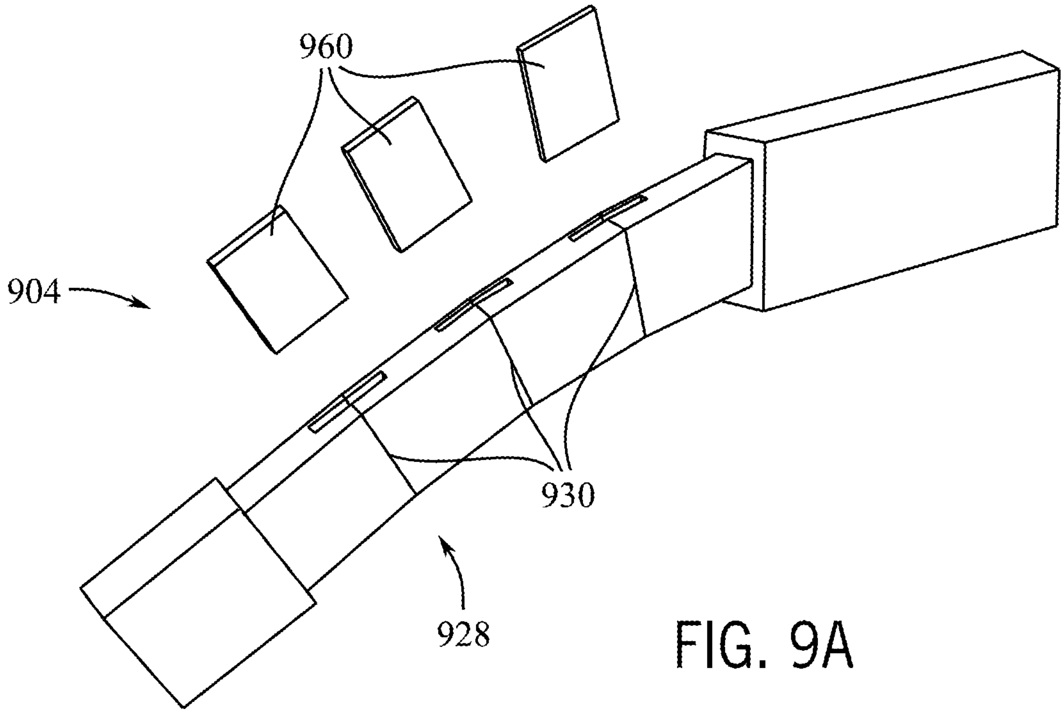
FIGS. 9A-9B show other examples of a securement arm of a head-mountable device.

FIG. 9A shows another example of a securement arm 904 having a plurality of arm segments 928, a plurality of joints 930 interconnecting the arm segments 928, and one or more inserts 960 positioned at least partially between adjacent arm segments 928. The insert 960 can include a plate positioned to resist bending (e.g., at the joint 930) to provide a biasing force resisting relative movement between adjacent arm segments 928. In one example, the plate is formed of spring steel, without intent to limit.

Figure 9B:
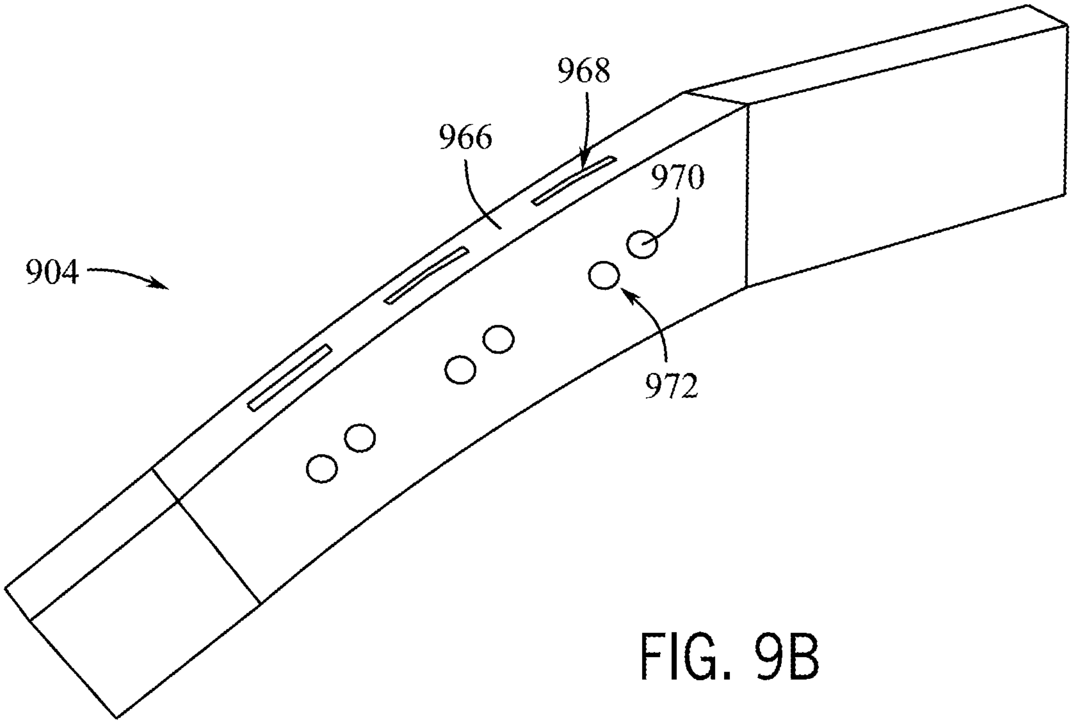

Referring to FIG. 9B, the securement arm 904 can include a cover 964. The cover 966 can be positioned over the joints 930. The cover 964 can be made of flexible, soft-goods material allowing the securement arm 904 to bend. As shown, the cover 964 can include a slot 968 to receive an insert 960 therethrough. For example, an insert 960 can be inserted through the slot 968 and into position between adjacent arm segments 928 (e.g., at the joint 930 between adjacent arm segments 928). In one example, the inserts 960 can be secured in place. For instance, one or more fasteners 970 can be used to secure each insert 960 in position. In some examples, the cover 964 can include one or more holes 972 to receive and access the fasteners 970. For example, the cover 964 can include multiple holes 972 to receive and access respective fasteners 970.

Any of the features, components, and/or parts, including the arrangements and configurations thereof shown in FIGS. 9A-9B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 9A-9B.

Figure 10:
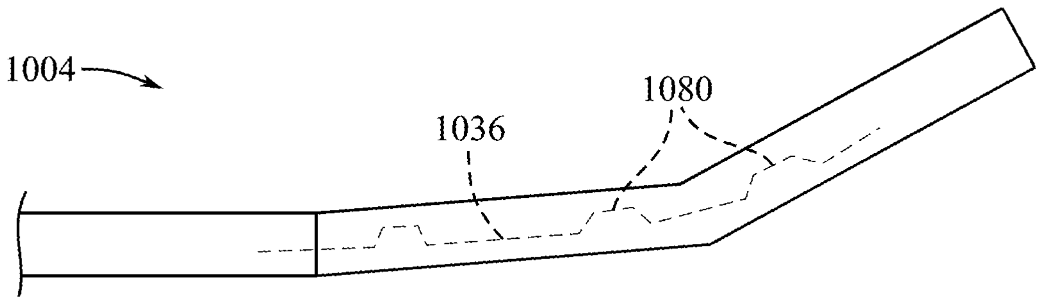
FIG. 10 shows another example of a securement arm of a head-mountable device.

FIG. 10 shows another example of a securement arm 1004 having a biasing member 1036. The biasing member 1036 can resist relative movement between portions of the securement arm 1004, such as to resist movement of the arm tip. In one example, the biasing member 1036 can be a one-piece element, such as a single piece of sheet metal. In one example, the biasing member 1036 can have a varied section stiffness throughout its length to enable multiple bending points. In one example, the multiple bending points can be defined by bends 1080 formed in the biasing member 1036.

Any of the features, components, and/or parts, including the arrangements and configurations thereof shown in FIG. 10 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 10.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® or X® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A securement arm for a head-mountable device, comprising:
- a frame;
- a window secured to the frame;
- a plurality of arm segments extending from the frame; and
- a plurality of joints interconnecting the plurality of arm segments, wherein each joint of the plurality of joints comprises:
  - adjacent first and second arm segments of the plurality of arm segments; and
  - a biasing member configured to provide a biasing force resisting a relative movement between the first arm segment and the second arm segment, wherein the biasing member comprises an insert positioned at least partially between the first arm segment and the second arm segment.

2. The securement arm of claim 1, wherein the insert comprises an elastomer bumper positioned to compress to provide the biasing force.

3. The securement arm of claim 1, wherein the insert comprises a spring steel plate positioned to resist bending to provide the biasing force.

4. The securement arm of claim 1, wherein:
- the plurality of joints comprises a first joint and a second joint;
- the first joint comprises a first biasing member having a first spring rate; and
- the second joint comprises a second biasing member having a second spring rate different than the first spring rate.

5. A head-mountable device comprising the securement arm of claim 1, wherein:
- the securement arm is a first securement arm; and
- the head-mountable device further comprises a frame and a second securement arm, the first and second securement arms extending from the frame.

6. The head-mountable device of claim 5, wherein the head-mountable device comprises a projector configured to project light toward the window.

7. A wearable device comprising:
- a frame; and
- a pair of securement arms extending from the frame, each securement arm of the pair of securement arms comprising:
  - a plurality of arm segments comprising a proximal arm segment coupled to the frame, a distal arm segment, and an intermediate arm segment between the proximal arm segment and the distal arm segment; and
  - a plurality of joints interconnecting the plurality of arm segments, wherein each joint of the plurality of joints comprises:

adjacent first and second arm segments of the plurality of arm segments; and a biasing member configured to provide a biasing force resisting a relative movement between the adjacent first and second arm segments, wherein the biasing member comprises an elastomer cord extending along the plurality of arm segments.

8. The wearable device of claim 7, wherein the biasing member comprises an elastomer bumper positioned to compress when the pair of securement arms are splayed away from each other.

9. The wearable device of claim 7, further comprising a groove extending contiguously along the plurality of arm segments, wherein the elastomer cord is positioned within the groove.

10. The wearable device of claim 9, wherein:

each joint of the plurality of joints defines a pivot point between the adjacent first and second arm segments; and the groove extends along an inner side of each pivot point.

11. An electronic device comprising:

a viewing frame;

an optically transparent window secured to the viewing frame;

a projector secured to the viewing frame;

an optical waveguide configured to direct light from the projector and displayed at the optically transparent window; and a securement arm extending from the viewing frame, the securement arm comprising:

a plurality of arm segments including a first arm segment, a second arm segment, and a third arm segment; and a plurality of joints interconnecting the plurality of arm segments, wherein each joint of the plurality of joints comprises:

adjacent arm segments of the plurality of arm segments; and a biasing member configured to resist an outward rotation of one of the plurality of arm segments away from the viewing frame, wherein the biasing member comprises a shape memory material.

12. The electronic device of claim 11, wherein each joint further comprises a stop to limit an inward rotation of the one of the one of the plurality of arm segments towards the viewing frame.

13. The electronic device of claim 11, wherein the biasing member comprises a first biasing member of shape memory material having a first original shape and extending contiguously along the plurality of arm segments; and further comprising a second biasing member of shape memory material having a second original shape and extending contiguously along the plurality of arm segments.

14. The electronic device of claim 13, wherein:

the securement arm comprises an inner side and an opposite outer side;

the first biasing member extends along the inner side; and the second biasing member extends along the outer side.

15. The electronic device of claim 14, wherein:

the first biasing member, when heated, is configured to move the securement arm in a first direction; and the second biasing member, when heated, is configured to move the securement arm in a second direction opposite the first direction.

* * * * *